United States Patent [19]

O'Leary

[11] Patent Number: 4,819,120

[45] Date of Patent: Apr. 4, 1989

[54] IMPEDANCE ARRANGEMENT FOR LIMITING TRANSIENTS

[75] Inventor: Raymond P. O'Leary, Evanston, Ill.

[73] Assignee: S&C Electric Company, Chicago, Ill.

[21] Appl. No.: 53,428

[22] Filed: May 18, 1987

Related U.S. Application Data

[63] Continuation-in-part of Ser. No. 890,425, Jun. 24, 1986, Pat. No. 4,695,918.

[51] Int. Cl.[4] .............................................. H02H 9/00

[52] U.S. Cl. .......................................... 361/58; 361/11

[58] Field of Search ................. 361/2, 10, 11, 58, 117, 361/127; 336/180, 182, 183, 188, 210

[56] References Cited

U.S. PATENT DOCUMENTS

| | | | |
|---|---|---|---|
| 3,376,475 | 4/1968 | Greber | 361/10 |
| 3,614,530 | 10/1971 | Baltensperger | 307/934 |
| 3,697,773 | 10/1971 | Reitan et al. | 307/93 |
| 3,836,819 | 8/1973 | Clausing | 307/136 |
| 3,912,975 | 10/1975 | Knauer et al. | 361/80 |
| 3,927,350 | 12/1975 | McConnell | 200/144 AP X |
| 4,110,806 | 8/1978 | Murano et al. | 361/11 X |
| 4,184,186 | 1/1980 | Barkan | 361/10 |
| 4,191,986 | 3/1980 | ta Huang et al. | 361/58 |
| 4,405,965 | 9/1983 | Weldon et al. | 361/43 |
| 4,523,249 | 6/1985 | Arimoto | 361/11 X |
| 4,550,356 | 10/1985 | Takahashi | 361/9 |
| 4,567,538 | 1/1986 | Arimoto et al. | 361/58 |
| 4,695,918 | 9/1987 | O'Leary | 361/58 |

OTHER PUBLICATIONS

IEEE Paper No. 865M 419-6, "Capacitor Switching and Transformer Transients", by B. S. Bayless, J. D. Selman, D. E. Truax, and W. E. Reid, 8 pages, 1986.

*Primary Examiner*—A. D. Pellinen

*Assistant Examiner*—Derek S. Jennings

*Attorney, Agent, or Firm*—James V. Lapacek

[57] ABSTRACT

An impedance arrangement is provided for use in a high-voltage circuit. For example, the impedance arrangement is useful in a circuit which includes reactance elements and a high-voltage circuit-switching device. The impedance arrangement limits transient inrush current and/or voltages in a first frequency range which occur in the circuit during closure of the circuit-switching device and damps transients in a second frequency range which occur in the circuit during opening of the circuit-switching device. The impedance arrangement is also useful in applications requiring tuning reactors and current-limiting to limit abnormal power-frequency currents, harmonics, transients, and/or high-frequency inrush currents. The impedance arrangement functions predominantly as an inductive impedance over a first frequency range; e.g., corresponding to the frequencies of transients encountered during the closing of a circuit-switching device. Additionally, the impedance arrangement functions predominantly as a resistance over a second frequency range which is higher than the first frequency range; e.g., corresponding to the frequencies of transient conditions on a power system such as are encountered during the opening of the circuit-switching device. The impedance arrangement comprises a first winding having a first predetermined inductance and a second winding connected in parallel with the first winding. The second winding has a second predetermined inductance and a second predetermined resistance. The second winding is wound with respect to the first winding in an opposite sense to the first winding and so as to define a predetermined mutual inductance between the first and second inductances.

20 Claims, 3 Drawing Sheets

IMPEDANCE ARRANGEMENT FOR LIMITING TRANSIENTS

CROSS REFERENCE TO RELATED APPLICATION

This application is a continuation-in-part application of Ser. No. 890,425, filed on July 24, 1986, now U.S. Pat. No. 4,695,918 in the name of Raymond P. O'Leary, which is hereby incorporated by reference for all purposes.

BACKGROUND OF THE INVENTION

1. Field of the Invention

The present invention relates generally to the field of high-voltage switches, reactors, and circuit-switching devices, and more particularly to an impedance arrangement that is useful to limit transients during both the closing and the opening of a circuit or that is useful as a tuning reactor or current-limiting reactor.

2. Related Art

When a circuit-switching device associated with back-to-back capacitor banks is closed, inrush currents may reach values of 10 to 30 thousand amperes and high-magnitude voltage transients are produced. On energizing single capacitor banks, the inrush currents are lower but voltage transients are still produced. Such transient currents and/or voltages can produce undesirable noise, both audible and electrical, and can also, of course, lead to distress or damage of items connected to the circuit. In particular applications and dependent on the circuit parameters, the frequencies of these transients are in the range of 200–750 hz. Additionally, transients may also be created during the deenergization of power systems including reactance elements. For example, high-voltage, high-frequency transients in the frequency range of 10 to 100 khz may occur when a circuit-switching device is opened. These transients can stress insulation and cause deterioration over time or disruptive discharges.

Examples of the transient conditions that occur in power systems are discussed in an article by Bayless, et al, entitled "Capacitor Switching and Transformer Transients," 1986 IEEE PES Summer Meeting, Paper No. 86SM 419-6. This article also discusses various methods to limit transients including switch-closing resistors, switch-opening resistors, controlled closing, capacitor-bank reactors, and surge arresters. Additional examples of various arrangements that utilize reactances to limit currents and/or voltages in high-voltage circuits are disclosed in the following U.S. Pat. Nos. 3,376,475; 3,614,530; 3,697,773; 3,836,819; 3,927,350; 4,405,965; 4,550,356; and 4,567,538. For example, U.S. Pat. Nos. 3,376,475, 3,836,819, 3,912,975, 3,927,350, 4,184,186, 4,550,356, and 4,567,538 are directed to various insertion or switching arrangements to limit fault currents. U.S. Pat. Nos. 3,614,530 and 3,697,773 are directed to limiting transients. The mutual inductance variations between movable windings is utilized in U.S. Pat. No. 4,405,965 to limit current. Current flow through the coils produces a force to increase the effective inductance and thereby limit the current. Both series and parallel arrangements are utilized in different embodiments.

A pre-insertion inductor arrangement is disclosed in copending U.S. application Ser. No. 890,425 filed on July 24, 1986 in the name of Raymond P. O'Leary. This arrangement is effective to limit transient inrush current and/or voltages during the closing of a circuit by a circuit-switching device. The pre-insertion inductor is in the circuit only briefly during closing of the circuit-switching device. Thus, the pre-insertion inductor is not required to carry system momentary or short-time currents and need only carry the current of the circuit during the portion of the insertion time after the inrush. Further, an effective impedance at the inrush frequencies is achieved with a pre-insertion inductor that is approximately the same size and lighter in weight than pre-insertion resistors. Since the pre-insertion inductor has relatively low losses, the energy dissipation requirements are significantly lower than for pre-insertion resistors. While the losses and the reactance of the pre-insertion inductor are low at the source frequency of the circuit, the effective impedance at the inrush frequencies is substantially higher since the inrush frequencies are typically 5 to 10 times higher than the source frequency.

Accordingly, the pre-insertion inductor arrangement is effective to limit transient-inrush currents and/or voltages incident to circuit closing when energizing capacitor banks. While the pre-insertion inductor arrangement is an improvement over prior arrangements regarding the limitation of transients during circuit closing, in certain situations the pre-insertion inductor can combine with other reactance in the circuit to result in high-frequency transient voltages during circuit opening. This can also occur with fixed reactors which are connected in the circuit or other prior-art combinations of opening inductors, etc.

Thus, in certain applications, the use of the pre-insertion inductor or a fixed reactor might be precluded due to the creation of high-frequency transients on circuit opening. A simple wire-wound damping resistor is not practical since the high-voltage wire-wound damping resistor also includes inductance that represents a high impedance at the high frequencies of the oscillating transient. Additionally, simple damping even utilizing a non-inductive resistor would not be extremely effective since the resistance of the damping resistor must be high enough to be capable of limiting energy dissipation during the pre-insertion time.

SUMMARY OF THE INVENTION

It is a principal object of the present invention to provide an impedance arrangement for use in a high-voltage circuit wherein the impedance arrangement performs substantially as an inductance over a first frequency range and wherein the impedance arrangement performs substantially as a resistance over a second frequency range which is higher than the first frequency range.

It is another object of the present invention to provide a pre-insertion inductor and a counter-wound damping winding that is connected in parallel with the pre-insertion inductor and that is wound with the pre-insertion inductor, but in an opposite sense such that the inductance of the pre-insertion inductor is substantially cancelled out in a frequency range of interest due to the mutual coupling of the pre-insertion inductor and the damping winding.

These and other objects of the present invention are achieved by providing an impedance arrangement for use in a high-voltage circuit. For example, the impedance arrangement is useful in a circuit which includes reactance elements and a high-voltage circuit-switching device. The impedance arrangement limits transient inrush current and/or voltages in a first frequency range which occur in the circuit during closure of the circuit-switching device and damps transients in a second frequency range which occur in the circuit during opening of the circuit-switching device. The impedance arrangement is also useful in applications requiring tuning reactors and current-limiting reactors to limit abnormal power-frequency currents, harmonics, transients, and/or high-frequency inrush currents. The impedance arrangement functions predominantly as an inductive impedance over a first frequency range; e.g., corresponding to the frequencies of transients encountered during the closing of a circuit-switching device. Additionally, the impedance arrangement functions predominantly as a resistance over a second frequency range which is higher than the first frequency range; e.g., corresponding to the frequencies of transient conditions on a power system such as are encountered during the opening of the circuit-switching device. The impedance arrangement comprises a first winding having a first predetermined inductance and a second winding connected in parallel with the first winding. The second winding has a second predetermined inductance and a second predetermined resistance. The second winding is wound with respect to the first winding in an opposite sense to the first winding and so as to define a predetermined mutual inductance between the first and second inductances.

BRIEF DESCRIPTION OF THE DRAWING

The invention, both as to its organization and method of operation, together with further objects and advantages thereof, will best be understood by reference to the accompanying drawing in which.

DETAILED DESCRIPTION

Figure 1:
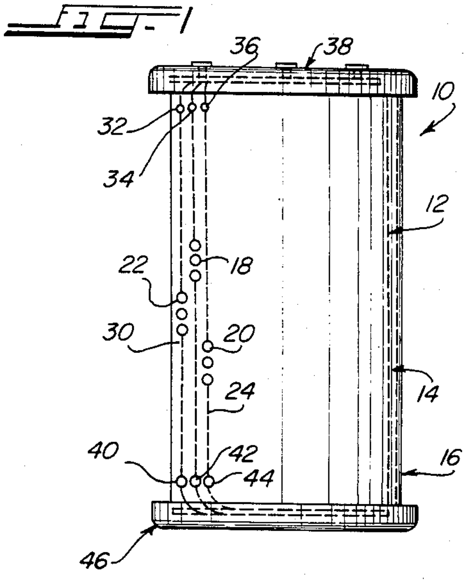
FIG. 1 is an elevational view of an impedance arrangement in accordance with the principles of the present invention.
Figure 2:
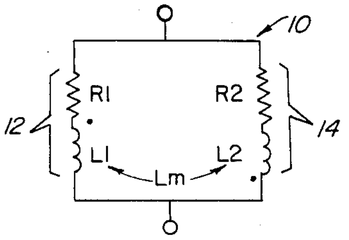
FIG. 2 is an electrical schematic drawing of the equivalent circuit of the impedance arrangement of FIG. 1.

Referring now to FIGS. 1 and 2, the impedance arrangement 10 of the present invention includes a first inductance winding 12 and a second counter-wound resistive winding 14; the windings 12 and 14 each being illustrated in the equivalent circuit of FIG. 2 as including an inductance and a resistance. Specifically, as shown in FIG. 2, the first inductance winding 12 includes an inductance L1 and a resistance R1. Similarly, the second counter-wound resistive winding 14 includes a resistance R2 and an inductance L2. As noted by the polarity dots in FIG. 2 adjacent the inductances L1 and L2, the second counter-wound resistive winding 14 is wound in a direction opposite to that of the first inductance winding 12. The windings 12 and 14 are arranged in the impedance arrangement 10 such that there is a high degree of coupling or mutual inductance between the inductances L1 and L2.

As will be discussed in more detail hereinafter, the selection of the parameters R1,R2 and L1,L2 along with the coupling between the inductances L1 and L2 allows the impedance arrangement 10 to function predominantly as an inductor in a first frequency range, while the impedance arrangement 10 functions predominantly as a resistor in a second frequency range higher than the first frequency range. For example, transient frequencies in the first frequency range may result when the impedance arrangement 10 is being utilized as either a pre-insertion impedance or fixed reactor and a circuit-switching device is closed to energize a single capacitor bank or to connect back-to-back capacitor banks. Additionally, transient frequencies in the second frequency range may result when opening the circuit or when encountering other power system transients.

Copending application Ser. No. 890,425 filed on July 24, 1986 in the name of Raymond P. O'Leary discloses a pre-insertion inductor arrangement which may be utilized with a circuit-switching device for limiting transients upon circuit closing. In that arrangement, while the general structure of the pre-insertion inductor is similar to the impedance arrangement 10 illustrated in FIG. 1 hereof, the pre-insertion inductor includes only the first inductance winding 12 illustrated in the equivalent circuit of FIG. 2. Reference may also be made to U.S. Pat. Nos. 3,576,414, 3,566,061, and 4,324,959, which are hereby incorporated by reference for all purposes, for illustration of various insertion arrangements utilized with circuit-switching devices. As further discussed in the aforementioned application Ser. No. 890,425 and the background section of this application, the first inductance winding 12 is effective to limit transients during circuit closing. The frequencies of the transients during circuit closing are determined in accordance with the impedance of the pre-insertion inductor and the circuit being switched.

When the first inductance winding 12 is utilized alone as a pre-insertion inductor, during circuit opening, the impedance of the first inductance winding 12 of the pre-insertion inductor along with the impedance of the circuit being switched can result in transients of much higher frequency than those encountered during circuit closing. For example, transient frequencies encountered during circuit closing may be in the first frequency range, for example, approximately 200 to 750 hz for specific circuits, while the transient frequencies encountered during circuit opening may be in the second frequency range, for example, 10 to 200 khz. Thus, the frequency of the transients during circuit opening are typically at least 10 times higher and can be more than 1000 times higher than those encountered during circuit closing. The pre-insertion inductor as exemplified by the first inductance winding 12 provides an extremely high impedance at the higher-frequency transients during circuit opening, but does not serve to effectively dampen the resulting voltage transients.

In accordance with important aspects of the present invention, the second counter-wound resistive winding 14 of the impedance arrangement 10 with mutual coupling of the inductances L1 and L2 causes the impedance arrangement 10 to function predominantly as a resistor over a second frequency range; e.g., at the frequencies of the transients during circuit opening so as to provide effective damping of these transients. To illustrate the manner in which the impedance arrangement 10 of the present invention functions during circuit closing and circuit opening, the impedance arrangement 10 will be described in terms of a pre-insertion impedance with the structural features as shown in FIG. 1 and in a pre-insertion circuit arrangement with specific parameters as will be discussed in detail hereinafter in connection with FIGS. 3–7. However, it should be realized that the specific illustration is not be considered in any limiting sense since the impedance arrangement of the present invention can be utilized as a fixed bus reactor, tuning reactor, current-limiting reactor, or the like and need not be limited to pre-insertion impedance arrangements.

Considering the structure of the specific illustrative embodiment of the impedance arrangement 10 of FIG. 1, the impedance arrangement 10 is fabricated as a hollow cylinder or cylindrical shell 16 in accordance with a known process wherein fiberglass strands or material are treated with epoxy and built up or set on a collapsible mandrel along with the desired turns of wire. Inductors that are fabricated using this process are available, for example, from Trench Electric of Toronto, Canada. The cylindrical shell 16 is fabricated to provide the first inductance winding 12 and the second counter-wound resistive winding 14 by the above process by utilizing two or more concentric layers of wires with epoxy-dipped fiberglass material being used to provide circumferential layers which support the layers of wire and also to coat and encapsulate the wires on the inside and outside of the hollow cylinder 16. After the various layers are cured, the mandrel is collapsed and removed.

As illustrated in FIG. 1, to form the first inductance winding 12, one or more layers of wire, each of which forms an inductance winding, is provided to arrive at the desired overall inductance and resistance for the winding 12. In the specific configuration of FIG. 1, two layers 18,20 are illustrated. Additionally, to form the second counter-wound resistive winding 14, one or more layers of wire referred to at 22 is wound over the layers 18,20 and in an opposite sense thereto. The layers of epoxy-fiberglass material are referred to generally at 24 and 30. The respective upper ends 32, 34, and 36 of the wire layers 22, 18, and 20 are connected to each other and to the upper mounting member of the end terminal referred to generally at 38. Similarly, the respective lower ends 40, 42, and 44 of the wire layers 22, 18, and 20 are connected to each other and to the lower mounting member of the lower end terminal referred to generally at 46.

Figure 3:
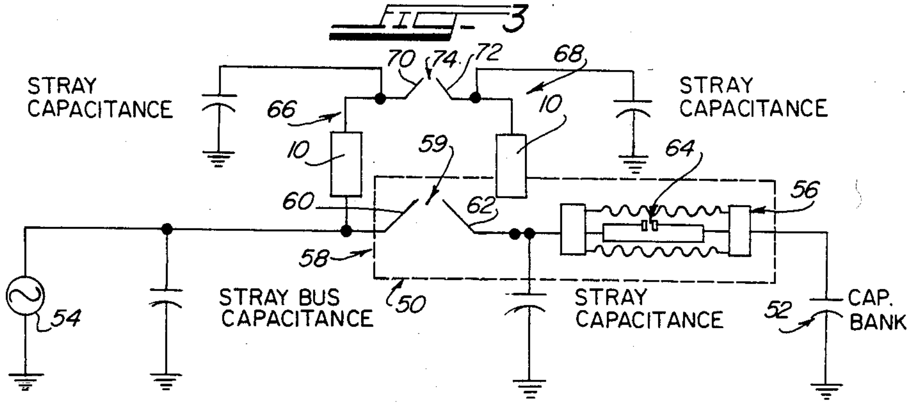
FIG. 3 is an electrical schematic drawing of an illustrative circuit to which the impedance arrangement of FIGS. 1 and 2 has application.

Considering now the illustrative specific circuit application illustrated in FIG. 3, a circuit-switching device 50 is arranged to selectively connect or disconnect a capacitor bank referred to at 52 and a source 54. The circuit-switching device 50 includes a circuit interrupter 56 and a center-break disconnecting switch 58. For example, the disconnecting switch 58 includes two switchblades 60,62 which are operable to make and break contact therebetween at a main gap 59. The circuit interrupter 56 includes one or more pairs of separable contacts generally referred to at 64.

The center-break disconnecting switch 58 is provided with two pre-insertion assemblies 66,68, each of which includes an impedance arrangement 10 and a respective conducting arm 70,72. The conducting arms 70,72 are operable to form an insertion gap referred to at 74. During closing of the main gap 59 and with the interrupter contacts 64 closed so as to energize the capacitor bank 52 from the source 54, the switchblades 60,62 and the conducting arms 70,72 are pivoted toward closure such that the gap 74 between the conducting arms 70,72 arcs over and a conductive path is established through the impedance arrangements 10 in advance of the completion of a conductive path through the switchblades 60,62. Reference may be made to the aforementioned U.S. application Ser. No. 890,425 and U.S. Pat. No. 3,576,414 for a more detailed description of the circuit-switching device 50 with the provision of pre-insertion assemblies.

During the closing of the circuit and energization of the capacitor bank 52 and in advance of completion of the conductive path through the switchblades 60,62, the transient inrush current and/or voltages are limited due to the impedance of the first inductance winding 12 of the impedance arrangement 10 in series with the source 54 and the capacitor bank 52 via the conductive path of the conducting arms 70,72. As discussed hereinbefore, the frequency of the transient is determined by the impedance of the circuit including the capacitor bank and the inductance of the impedance arrangements 10, as well as other circuit impedances. For example, if the first inductance winding 12 includes an inductance value L1 of 10 mh and the capacitor bank is 7.7 microfarads, the transient frequencies would be in the range of 500 to 600 hz, ignoring any substantial effects of other impedances. At this frequency, the impedance of the first inductance winding 12 would have an effective impedance of approximately 30 or 40 ohms of inductive reactance to limit the transient-inrush current. The R1 resistance component of the first inductance winding 12 also serves to damp the transients, but is chosen to have a low resistance to limit the energy which it needs to dissipate during closing. The resistance component R2 of the second counter-wound resistive winding is selected to be high enough to avoid undesirable dissipation of losses during the insertion time. The resistance component R2 is also selected to be much higher than the effective impedance of the first inductance winding 12 in the frequency range of 200–750 hz, thereby minimizing the effect of the second counter-wound resistive winding 14 on the circuit in the range of 200–750 hz. In a specific configuration of the impedance arrangement 10, R1 is 2.5 ohms, L1 is 10.00 mh, R2 is 3.3 kohms, L2 is 9.60 mh, and the coupling of L1 and L2 provides a mutual inductance Lm of 9.66 mh.

Figure 4:
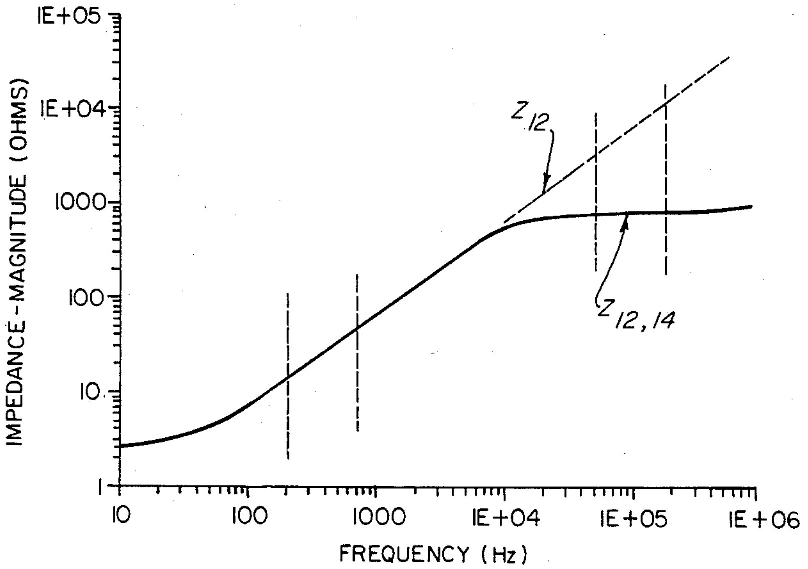
FIGS. 4 and 5 are graphical representations with respect to frequency of the magnitude and phase angle, respectively, of the impedance arrangement of the present invention.
Figure 5:
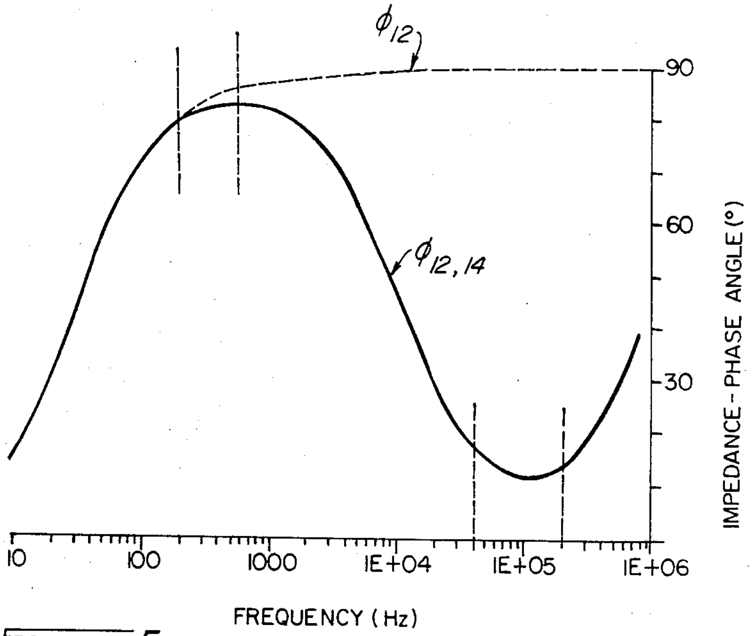

Referring now to FIGS. 4 and 5, the impedance of the impedance arrangement 10 is represented with respect to frequency; the solid curve in FIG. 4 representing the magnitude and the solid curve in FIG. 5 representing the phase angle. The dashed-line curves in FIGS. 4 and 5 represent the impedance of the first inductance winding 12 without the contribution and effects of the second counter-wound resistance winding 14. In the range of 200 to 750 hz, the magnitude and phase angle of the impedance of the parallel combination of the windings 12 and 14 are essentially identical to that of the first inductance winding 12 alone. As can be seen from the curves of FIGS. 4 and 5, the impedance arrangement 10 functions predominantly as an inductive reactance for the frequency range of 200 to 750 hz.

Figure 6:
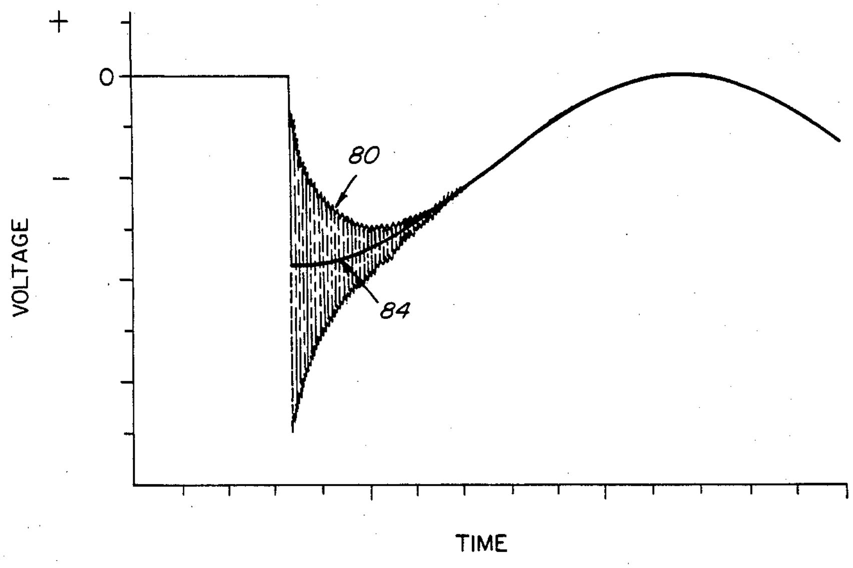
FIGS. 6 and 7 are graphical representations illustrating the reduction of transients obtained by utilization of the impedance arrangement of FIGS. 1 and 2.
Figure 7:
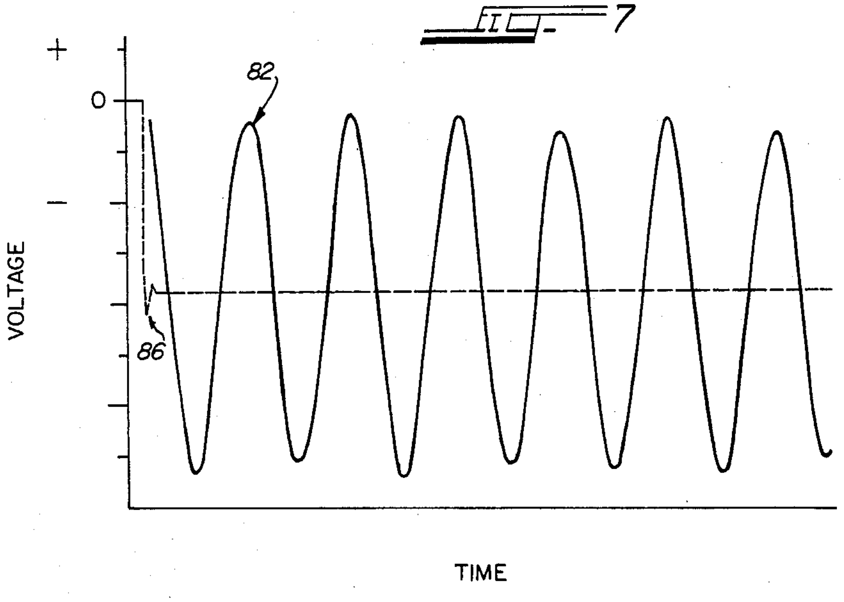

Referring now again to FIG. 3 and as discussed hereinbefore, upon the opening of the interrupter contacts 64 and the switchblades 60,62, high-frequency transients, for example in the range of 50 to 200 khz, may occur due to the interaction between the inductance L1 and other circuit capacitances. The high-frequency, oscillating transient waveform is illustrated in FIGS. 6 and 7, where FIG. 7 is an expanded-time-scale depiction of FIG. 6.

In accordance with important aspects of the present invention, with the addition of the second counter-wound resistive winding 14 in the opposite sense to the first inductance winding 12 along with the values of L1 and L2 and suitable mutual coupling of the inductances L2 and L1, the impedance arrangement 10 functions predominantly as a resistor at the higher frequencies, as can be seen in FIGS. 4 and 5. Similarly, the damping of the transients by the impedance arrangement 10 is illustrated by the curves 84,86, respectively, in FIGS. 6 and 7. To obtain optimum performance to limit and damp transients, the impedance arrangement 10 functions as a resistor in the presence of the higher-frequency transients; this being achieved in a specific configuration with L1 equal to 10.00 mh and L2 being 9.60 mh, and the windings being coupled as shown in FIG. 1 such that the mutual inductance Lm equals 9.66 mh. Accordingly, the inductance L1 of the first inductance winding 12 in the range of 50 to 200 khz is nearly totally cancelled out. For example, if a separate resistive winding such as 14 were utilized without the mutual coupling of L2 to L1, the effective damping would be substantially reduced due to the high impedance of the inductance L2 of the second counter-wound resistive winding 14 which is in series with the damping resistance R2.

While there have been illustrated and described various embodiments of the present invention, it will be apparent that various changes and modifications as will occur to those skilled in the art. For example, it should be realized that the parameters may be selected to provide the desired characteristics at various frequencies or over various frequency ranges. It is intended in the independent claims to cover all such changes and modifications as fall within the true spirit and scope of the present invention.

What is claimed and desired to be secured by Letters of Patent of United States is:

1. An impedance arrangement for use in a high-voltage circuit, the impedance arrangement comprising a first winding having a first predetermined inductance and a second winding connected in parallel with said first winding, said second winding having a second predetermined inductance and a second predetermined resistance, said second winding being wound with respect to said first winding in an opposite sense to said first winding and so as to define a predetermined mutual inductance between said first and second inductances, said second predetermined resistance being determined to have an impedance that is at least 10 times the reactance of said first inductance at a first predetermined frequency.

2. The impedance arrangement of claim 1 wherein said first and second predetermined inductances, said second predetermined resistance and said predetermined mutual inductance are determined so that said impedance arrangement is predominantly inductive over a first range of frequencies and is predominantly resistive over a second range of frequencies.

3. The impedance arrangement of claim 2 wherein said second range of frequencies is higher than said first range of frequencies.

4. The impedance arrangement of claim 1 wherein said first and second predetermined inductances, said second predetermined resistance and said predetermined mutual inductance are determined so that said impedance arrangement is predominantly inductive at a first frequency and is predominantly resistive at a second frequency.

5. The impedance arrangement of claim 4 wherein said second frequency is higher than said first frequency.

6. The impedance arrangement of claim 4 wherein said second frequency is at least 10 times said first frequency.

7. The impedance arrangement of claim 4 wherein said second frequency is in the range of 10,000 to 200,000 hz.

8. The impedance arrangement of claim 4 wherein said second frequency is in the range of 10 to 1000 times said first frequency.

9. The impedance arrangement of claim 1 wherein said first inductance, said second inductance, and said predetermined mutual inductance are approximately equal.

10. The impedance arrangement of claim 1 wherein said second predetermined resistance is determined to have an impedance which is on the order of 100 times the reactance of said first inductance at a first predetermined frequency.

11. The impedance arrangement of claim 1 wherein said first winding has a first predetermined resistance.

12. An arrangement for limiting abnormal currents and/or voltages in a high-voltage circuit, the arrangement comprising impedance means providing a predominantly inductive impedance over a first frequency range and providing a predominantly resistive impedance over a second frequency range which is higher than said first frequency range, said impedance means comprising a first winding and a second winding being connected across said first winding and being oppositely wound with respect to said first winding.

13. The arrangement of claim 12 wherein said first and second windings are closely coupled.

14. The arrangement of claim 12 wherein said first and second windings define inductances and a mutual inductance that are approximately equal.

15. The arrangement of claim 14 wherein said second winding further defines a resistance.

16. The arrangement of claim 15 wherein said resistance is at least 10 times the impedance of each of said inductances over said first frequency range.

17. An impedance arrangement for use with a high-voltage circuit-switching device in a circuit to limit transients in the circuit during closure of the circuit-switching device and to damp transients in the circuit during opening of the circuit-switching device, the impedance arrangement comprising a first winding having a first predetermined inductance, a second winding connected in parallel with said first winding, and means for inserting said first and second windings into the circuit during closure of the circuit-switching device and for inserting said first and second windings into the circuit during opening of the circuit-switching device, said second winding having a second predetermined inductance and a second predetermined resistance, said second winding being wound with respect to said first winding in an opposite sense to said first winding and so as to define a predetermined mutual inductance between said first and second inductances.

18. The impedance arrangement of claim 17 wherein said first winding has a first predetermined resistance.

19. An impedance arrangement for use with a high-voltage circuit-switching device in a circuit to limit transients in the circuit during closure of the circuit-switching device and to damp transients in the circuit during opening of the circuit-switching device, the circuit-switching device including a switchblade which is movable between an open position and a closed position, the impedance arrangement comprising a first winding having a first predetermined inductance, a second winding connected in parallel with said first winding, and means for inserting said first and second windings into the circuit during closure of the circuit-switching device, said inserting means comprising conductive means creating an electrical path through said first and second windings as the switchblade is moved from the open position toward the closed position, said second winding having a second predetermined inductance and a second predetermined resistance, said second winding being wound with respect to said first winding in an opposite sense to said first winding and so as to define a predetermined mutual inductance between said first and second inductances.

20. An impedance arrangement for use in a high-voltage circuit operable at a predetermined source frequency, the impedance arrangement comprising a first winding having a first predetermined inductance and a second winding connected in parallel with said first winding, said second winding having a second predetermined inductance and a second predetermined resistance, said second winding being wound with respect to said first winding in an opposite sense to said first winding and so as to define a predetermined mutual inductance between said first and second inductances, said second predetermined resistance being determined to have an impedance that is at least 10 times the reactance of said first inductance at a first predetermined frequency, said first predetermined frequency being higher than said source frequency.

* * * * *

UNITED STATES PATENT AND TRADEMARK OFFICE
CERTIFICATE OF CORRECTION

PATENT NO. : 4,819,120
DATED : April 4, 1989
INVENTOR(S) : Raymond P. O'Leary

It is certified that error appears in the above-identified patent and that said Letters Patent is hereby corrected as shown below:

In the Abstract, line 12, after "current-limiting" insert -- reactors --.

Signed and Sealed this
Seventeenth Day of October, 1989

*Attest:*

DONALD J. QUIGG

*Attesting Officer* *Commissioner of Patents and Trademarks*